(12) United States Patent
Meagher et al.

(10) Patent No.: US 8,045,863 B2
(45) Date of Patent: Oct. 25, 2011

(54) BYTE-INTERLEAVING SYSTEMS AND METHODS FOR 100G OPTICAL TRANSPORT ENABLING MULTI-LEVEL OPTICAL TRANSMISSION

(75) Inventors: Kevin S. Meagher, Bowie, MD (US); John P. Mateosky, West River, MD (US); Steven A. Surek, Leonardo, NJ (US)

(73) Assignee: Ciena Corporation, Linthicum, MD (US)

( * ) Notice: Subject to any disclaimer, the term of this patent is extended or adjusted under 35 U.S.C. 154(b) by 676 days.

(21) Appl. No.: 11/964,502

(22) Filed: Dec. 26, 2007

(65) Prior Publication Data

US 2009/0169217 A1 Jul. 2, 2009

(51) Int. Cl.
*H04B 10/04* (2006.01)
*H04L 12/66* (2006.01)
(52) U.S. Cl. .................. 398/193; 398/158; 370/356
(58) Field of Classification Search .......... 398/158, 398/159, 192, 193
See application file for complete search history.

(56) References Cited

U.S. PATENT DOCUMENTS

2004/0096213 A1* 5/2004 Perkins et al. ............... 398/27
2005/0286521 A1* 12/2005 Chiang et al. ............... 370/389
2007/0248121 A1* 10/2007 Zou ............................. 370/498

OTHER PUBLICATIONS

ITU-T G.709, Interfaces for the Optical Transport Network (OTN); International Telecommunication Union, Mar. 2003.*

* cited by examiner

*Primary Examiner* — Nathan Curs
(74) *Attorney, Agent, or Firm* — Clements Bernard PLLC; Christopher L. Bernard; Lawrence A. Baratta, Jr.

(57) ABSTRACT

The present invention provides byte-interleaving systems and methods for Optical Transport Unit N (OTUN) (i.e. Optical Transport Unit 4 (OTU4)) and 100 Gb/s (100 G) optical transport enabling multi-level optical transmission. The byte-interleaving systems and methods of the present invention support the multiplexing of sub-rate clients, such as 10 Gb/s (10 G) clients, 40 Gb/s (40 G) clients, etc., into two 50 Gb/s (50 G) logical flows, for example, that can be forward error correction (FEC) encoded and carried on a single wavelength to provide useful, efficient, and cost-effective 100 G optical transport today. Signaling format support allows these two 50 G logical flows to be forward compatible with an evolving OTU4 and 100 G signaling format without waiting for optical and electronic technology advancement. Signaling format support also allows an evolving standard 100 G logical flow (i.e. OTU4, 100 Gb/s Ethernet (100 GbE), etc.) to be carried as 2×50 G logical flows, 4×25 G logical flows, or other lower rate formats on a single wavelength.

25 Claims, 7 Drawing Sheets

BYTE-INTERLEAVING SYSTEMS AND METHODS FOR 100G OPTICAL TRANSPORT ENABLING MULTI-LEVEL OPTICAL TRANSMISSION

FIELD OF THE INVENTION

The present invention relates generally to the optical networking field. More specifically, the present invention relates to byte-interleaving systems and methods for Optical Transport Unit N (OTUN) (i.e. Optical Transport Unit 4 (OTU4)) and 100 Gb/s (100 G) optical transport enabling multi-level optical transmission. The byte-interleaving systems and methods of the present invention support the multiplexing of sub-rate clients, such as 10 Gb/s (10 G) clients, 40 Gb/s (40 G) clients, etc., into two 50 Gb/s (50 G) logical flows, for example, that can be forward error correction (FEC) encoded and carried on a single wavelength to provide useful, efficient, and cost-effective 100 G optical transport today. Signaling format support allows these two 50 G logical flows to be forward compatible with an evolving OTU4 and 100 G signaling format without waiting for optical and electronic technology advancement. Signaling format support also allows an evolving standard 100 G logical flow (i.e. OTU4, 100 Gb/s Ethernet (100 GbE), etc.) to be carried as 2×50 G logical flows, 4×25 G logical flows, or other lower rate formats on a single wavelength.

BACKGROUND OF THE INVENTION

At present, state-of-the-art 100 Gb/s (100 G) optical transport work is occurring in two areas: 1) transmission and modulation format development and 2) framing and standards body work required to define 100 G optical transport framing and multiplexing standards. Transmission and modulation format development falls into two categories: 1) 100 G serial optical transmission as demonstrated by network gear providers and other researchers performing 100 G optical transmission "hero" experiments, which focus on the accumulation of knowledge but not necessarily efficiency or cost-effectiveness, and 2) realistic transmission and modulation schemes that are based on present and future optical and electronic technologies, which typically involve transmission and modulation schemes that attempt to provide greater spectral efficiency, solve dispersion problems, and limit baud rates by providing multiple bits-per-symbol encodings and/or by using enhanced forward error correction (FEC) schemes, such as duo-binary modulation, Differential Phase Shift Keying (DPSK), Differential Quadrature Phase Shift Keying (DQPSK), and the like.

In general, standards bodies are looking several years into the future to define framing formats (i.e. Optical Transport Unit 4 (OTU4) in International Telecommunications Union (ITU) Study Group 15), backplane interface standards, and multiplexing schemes, which are unrealizable for 100 G optical transport today but will become feasible in the future. Thus, for network providers that desire 100 G optical transport solutions sooner rather than later, a disconnect exists.

At present, state-of-the-art 100 G optical transmission systems/methods do not exist in deployed networks. They are, however, actively being researched and designed to address the need for ever-increasing packet bandwidth and logical flow requirements. Long-haul 100 G serial optical transmission is possible but very unrealistic today given present optical and electronic technologies, and the same is true for the foreseeable future. Coupled with the forthcoming OTU4 100 G optical framing standard, the stage is set for present optical and electronic technologies to fall short in delivering an efficient and cost-effective 100 G optical transport system that suits the needs of today's bandwidth-hungry network providers. Thus, what is needed in the art is an approach that preserves standard framing formats and interoperability while enabling spectrally efficient 100 G optical transport today.

BRIEF SUMMARY OF THE INVENTION

In various exemplary embodiments, the present invention provides byte-interleaving systems and methods for Optical Transport Unit N (OTUN) (i.e. Optical Transport Unit 4 (OTU4)) and 100 Gb/s (100 G) optical transport enabling multi-level optical transmission. The byte-interleaving systems and methods of the present invention support the multiplexing of sub-rate clients, such as 10 Gb/s (10 G) clients, 40 Gb/s (40 G) clients, etc., into two 50 Gb/s (50 G) logical flows, for example, that can be forward error correction (FEC) encoded and carried on a single wavelength to provide useful, efficient, and cost-effective 100 G optical transport today. Signaling format support allows these two 50 G logical flows to be forward compatible with an evolving OTU4 and 100 G signaling format without waiting for optical and electronic technology advancement. Signaling format support also allows an evolving standard 100 G logical flow (i.e. OTU4, 100 Gb/s Ethernet (100 GbE), etc.) to be carried as 2×50 G logical flows, 4×25 G logical flows, or other lower rate formats on a single wavelength. Advantageously, the byte-interleaving systems and methods of the present invention can be implemented in digital circuitry (i.e. a field-programmable gate array (FPGA) or the like) available today, and can support a multitude of optical modulation formats conducive to propagating 100 G or greater.

In one exemplary embodiment, the present invention provides a multiplexing transponder, including: a plurality of framers operable for receiving one or more incoming logical flows, byte-deinterleaving the one or more incoming logical flows, and creating a plurality of outgoing logical flows; and a plurality of transport interface and optics modules operable for receiving the plurality of outgoing logical flows and transporting the plurality of outgoing logical flows on one or more channels along an optical network. The one or more incoming logical flows consist of a 100 G incoming logical flow, 2×50 G incoming logical flows, 4×25 G incoming logical flows, or 10×10 G incoming logical flows, for example. The plurality of outgoing logical flows consist of 2×50 G outgoing logical flows or 4×25 G outgoing logical flows, for example. The plurality of transport interface and optics modules consist of two 50 G transport interface and optics modules or four 25 G transport interface and optics modules, for example. The one or more channels consist of two channels or four channels, for example. Given that the one or more incoming logical flows comprise 2×50 G logical flows, the 2×50 G logical flows emanate from a OTU4 or 100 GbE (100 G) framer with byte-multiplex/demultiplex capability. The plurality of framers comprise two ½-OTU4 (50 G) FEC framers, wherein the two ½-OTU4 (50 G) FEC framers are operable for creating a plurality of odd column ½-ODU4 frames and a plurality of even column ½-ODU4 frames; combining a pair of odd column ½-ODU4 frames to create an odd transport frame and combining a pair of even column ½-ODU4 frames to create an even transport frame; relocating selected bytes from a first odd column ½-ODU4 frame to a second half of the odd transport frame and relocating selected bytes from a first even column ½-ODU4 frame to a second half of the even transport frame; inserting selected bytes into the first half of the odd transport frame and inserting selected bytes into the first half of the even transport frame; and inserting FEC columns into the odd transport frame and inserting FEC columns into the even transport frame. The multiplexing transponder also includes means for frame aligning, descrambling, and FEC decoding the one or more incoming logical flows. The multiplexing transponder further includes means for FEC encoding and scrambling the plurality of outgoing logical flows.

In another exemplary embodiment, the present invention provides a method for high-data rate optical transport enabling multi-level optical transmission, including: receiving a high-data rate client signal; 1:2 byte-deinterleaving the high-data rate client signal into a plurality of odd column frames and a plurality of even column frames; combining a pair of odd column frames to create an odd transport frame and combining a pair of even column frames to create an even transport frame; relocating selected bytes from a first half of the odd transport frame to a second half of the odd transport frame and relocating selected bytes from a first half of the even transport frame to a second half of the even transport frame; inserting selected bytes into the first half of the odd transport frame and inserting selected bytes into the first half of the even transport frame; inserting FEC columns into the odd transport frame and inserting FEC columns into the even transport frame; and providing a first logical flow associated with the odd transport frame and a first channel and providing a second logical flow associated with the even transport frame and a second channel. Optionally, the high-data rate client signal consists of an OTU4 client signal, the plurality of odd column frames consist of a plurality of odd column ½-ODU4 frames, and the plurality of even column frames consist of a plurality of even column ½-ODU4 frames. The method also includes frame aligning, descrambling, and FEC decoding the high-date rate client signal. The selected bytes relocated from the first half of the odd transport frame to the second half of the odd transport frame consist of MFAS, SM-BIP, and GCC0 bytes. The selected bytes relocated from the first half of the even transport frame to the second half of the even transport frame consist of SM-TTI, SM-ST, and GCC0 bytes. The selected bytes inserted into the first half of the odd transport frame consist of FAS bytes and the selected bytes inserted into the first half of the even transport frame consist of FAS bytes. The method further includes scrambling each of the first logical flow and the second logical flow. The method still further includes transporting the first channel and the second channel over a single wavelength in an optical network.

In a further exemplary embodiment, the present invention provides a method for high-data rate optical transport enabling multi-level optical transmission, including: receiving a first logical flow associated with an odd transport frame and a first channel and receiving a second logical flow associated with an even transport frame and a second channel; relocating selected bytes from a second half of the odd transport frame to a first half of the odd transport frame and relocating selected bytes from a second half of the even transport frame to a first half of the even transport frame; inserting selected bytes into the second half of the odd transport frame and inserting selected bytes into the second half of the even transport frame; separating the odd transport frame into a pair of odd column frames and separating the even transport frame into a pair of even column frames; aligning the first channel and the second channel; and 2:1 byte-interleaving the pair of odd column frames and the pair of even column frames into a high-data rate client signal. Optionally, the pair of odd column frames consist of a pair of odd column ½-ODU4 frames, the pair of even column frames consist of a pair of even column ½-ODU4 frames, and the high-data rate client signal consists of an OTU4 client signal. The method also includes frame aligning, descrambling, and FEC decoding the first channel and the second channel. The selected bytes relocated from the second half of the odd transport frame to the first half of the odd transport frame consist of MFAS, SM-BIP, and GCC0 bytes. The selected bytes relocated from the second half of the even transport frame to the first half of the even transport frame consist of SM-TTI, SM-ST, and GCC0 bytes. The selected bytes inserted into the second half of the odd transport frame consist of OA bytes and the selected bytes inserted into the second half of the even transport frame consist of OA bytes.

For purposes of the present invention, optical channels and electrical channels should be distinguished, with optical channels being modulated and the like and electrical channels being processed electronically (encoded/decoded, interleaved/deinterleaved, scrambled/descrambled, and the like).

BRIEF DESCRIPTION OF THE DRAWINGS

The present invention is illustrated and described herein with reference to the various drawings, in which like reference numbers are used to denote like system components/method steps, as appropriate, and in which.

DETAILED DESCRIPTION OF THE INVENTION

Figure 1:
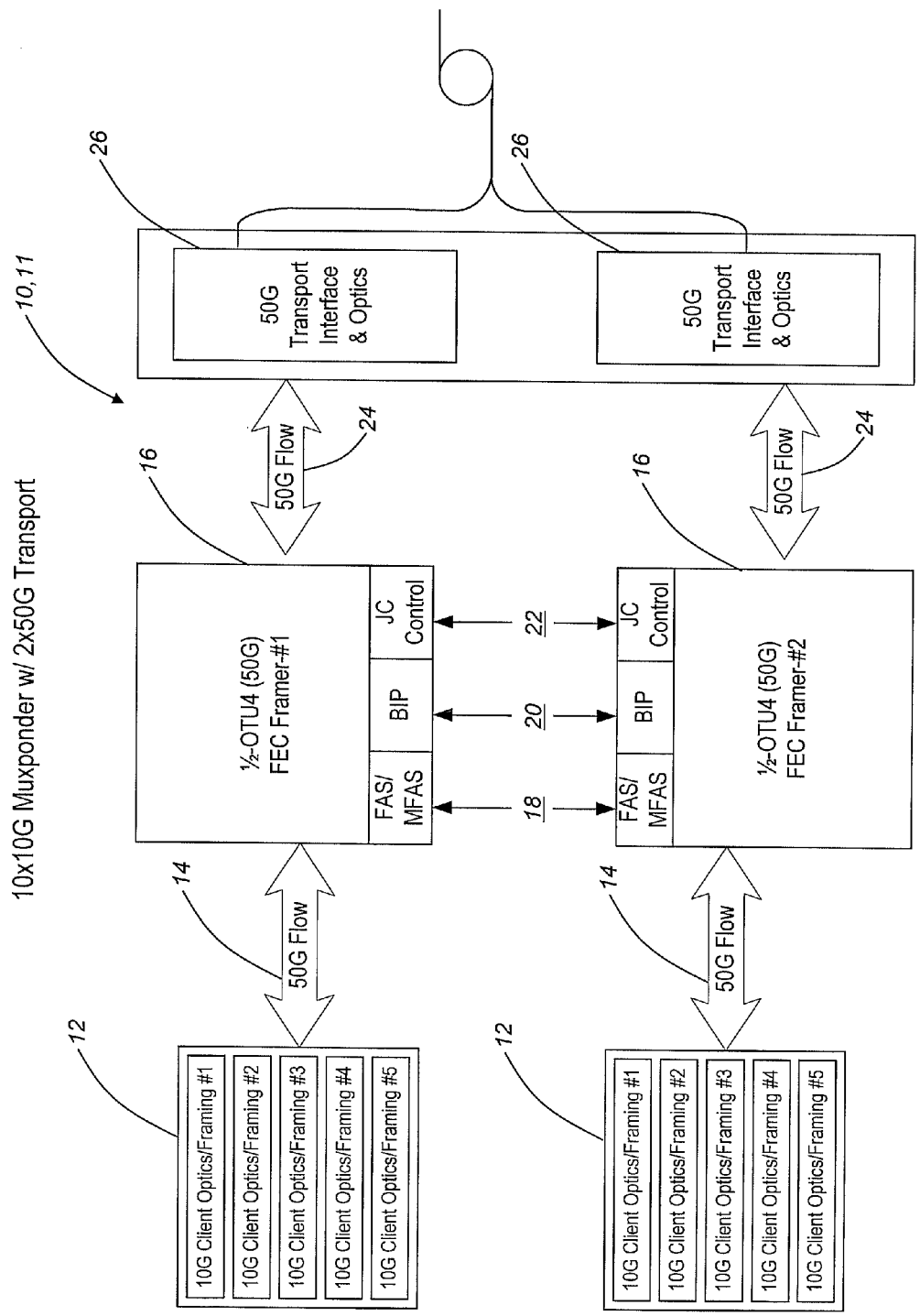
FIG. 1 is a schematic diagram illustrating, in one exemplary embodiment of the present invention, a 10×10 Gb/s (10 G) multiplexing transponder (MUXPONDER) utilizing 2×50 Gb/s (50 G) transport.

As alluded to above, the present invention provides a multi-channel framing protocol that enables the development of 100 Gb/s (100 G) multiplexing transponders (MUXPONDERS) and other optical transport equipment today. Advantageously, this optical transport equipment initially multiplexes (MUXs)/demultiplexes (DEMUXs) lower rate client signals, such as Optical Transport Unit 2 (OTU2) client signals, 10 Gb/s Ethernet (10 GbE) client signals, Optical Carrier-192 (OC-192) client signals, Optical Carrier-768c (OC-768c) client signals, etc., into two 50 Gb/s (50 G) or four 25 Gb/s (25 G) logical flows that are carried over a single wavelength. This is done using off-the-shelf electronic technologies that are compatible with future 100 G standard signaling formats, such as Optical Transport Unit 4 (OTU4) and 100 Gb/s Ethernet (100 GbE). The sub-rate multiplexed (MUXd) client signals are byte-demultiplexed (DEMUXd) prior to being encapsulated into a ½-OTU4-like frame, in the case of 2×50 G optical transport. The two 50 G encapsulated frames are constructed to properly compute section-bit-interleaved parity (BIP) and justification control (JC), as well as frame alignment (FAS) and multi-frame alignment (MFAS) with respect to each other. The two 50 G encapsulated frames are then individually forward error correction (FEC) encoded and modulated as individual, but synchronized, logical flows and transported through the network. Upon reception, demodulation, and FEC decoding (i.e. termination of the optical transport signal), the terminated signals (i.e. the two ½-Optical Data Unit 4 (ODU4)-like signals are byte-interleaved and transformed back into the original client signal form (e.g. 10 10 GbE client signals, etc.) or converted into a standard 100 G serial OTU4 signal.

At present, serial 100 G optical transmission is not feasible from a performance and cost standpoint. However, 100 G optical transmission is very feasible if alternate modulation schemes are used to improve the spectral efficiency and baud rate of the optical transmission, without compromising the overall throughput or regenerated distance limits. Modulation schemes, such as Return-to-Zero-Differential Quadrature Phase Shift Keying (RZ-DQPSK) and the like, allow for multiple bits per symbol, and also allow for a 100 G logical flow to be broken into 2×50 G or 4×25 G logical flows for processing using electronic components available today. If a modulation scheme is developed that allows a 100 G OTU4-framed signal to be carried seamlessly by spectrally efficient means, using today's electronic components, this would allow for a much more cost-efficient deployment of 100 G optical transport gear. This would occur much sooner than serial 100 G optical transmission, while providing for much greater distance performance without compromising client-side interoperability or requiring exotic electronic component development.

100 G transponder and MUXPONDER applications are vital in long haul optical transport networks as optical fiber bandwidth continues to be absorbed by voice, video, and other data-centric applications, first in highly populated urban networks, and eventually in worldwide networks. Single wavelength, spectrally efficient transport techniques solve this problem without compromising regeneration distances.

FIG. 1 is a schematic diagram 10 illustrating, in one exemplary embodiment of the present invention, a 10×10 Gb/s (10 G) MUXPONDER 11 utilizing 2×50 G transport. 10×10 G client data signals 12, such as 10×10 GbE client data signals or the like are received as two 50 G logical flows 14 at two ½-OTU4 (50 G) FEC framers 16 which are synchronized, as appropriate, via FAS and MFAS 18, BIP 20, and JC 22. These two 50 G framed logical flows 24 are then received at two 50 G transport interface and optics modules 26 for transport utilizing a Differential Phase Shift Keying (DPSK), Differential Quadrature Phase Shift Keying (DQPSK), RZ-DQPSK modulation scheme, a coherent and synchronous scheme, or the like. Of note, 4×25 G client data signals (not illustrated) could also be received, four 25 G logical flows (not illustrated) could also be utilized, four ¼-OTU4 (25 G) FEC framers (not illustrated) could also be used, etc. Also of note, although one logical flow direction has been described herein, the opposite logical flow direction would operate similarly.

The concepts of FIG. 1 could readily be extended to support an alternate arrangement of 2×(40 G+10 G) utilizing 2×50 G transport as well. In the 10×10 G and 2×(40 G+10 G) cases, two composite electrical flows are created that are subsequently modulated into a single optical channel, or multiple optical channels. The goal is to create two composite electrical flows such that they can be treated (i.e. re-assembled) as a standard 100 G signal in the future. This requires limited cooperation between the two composite electrical flows when created (i.e. terminated) in order to support 50 G and 100 G signaling functions and easy assembly into a standard 100 G format when the time comes. The two composite electrical flows want to perform justifications (JC 22) in such a manner that it is compatible with the 5-column justification scheme utilized in OTN today. The two composite electrical flows need BIP, i.e. bit-interleaved parity checks, over each signal, while maintaining the underlying sub-rate (e.g. 10×10 G) signals transparently and supporting BIP at the 100 G signaling level. The composite signals need FAS, i.e. frame alignment, and MFAS, i.e. multi-frame alignment, implemented in such a manner as to allow for 100 G signaling in the future while remaining functional for the two composite electrical flows to find frame.

Figure 2:
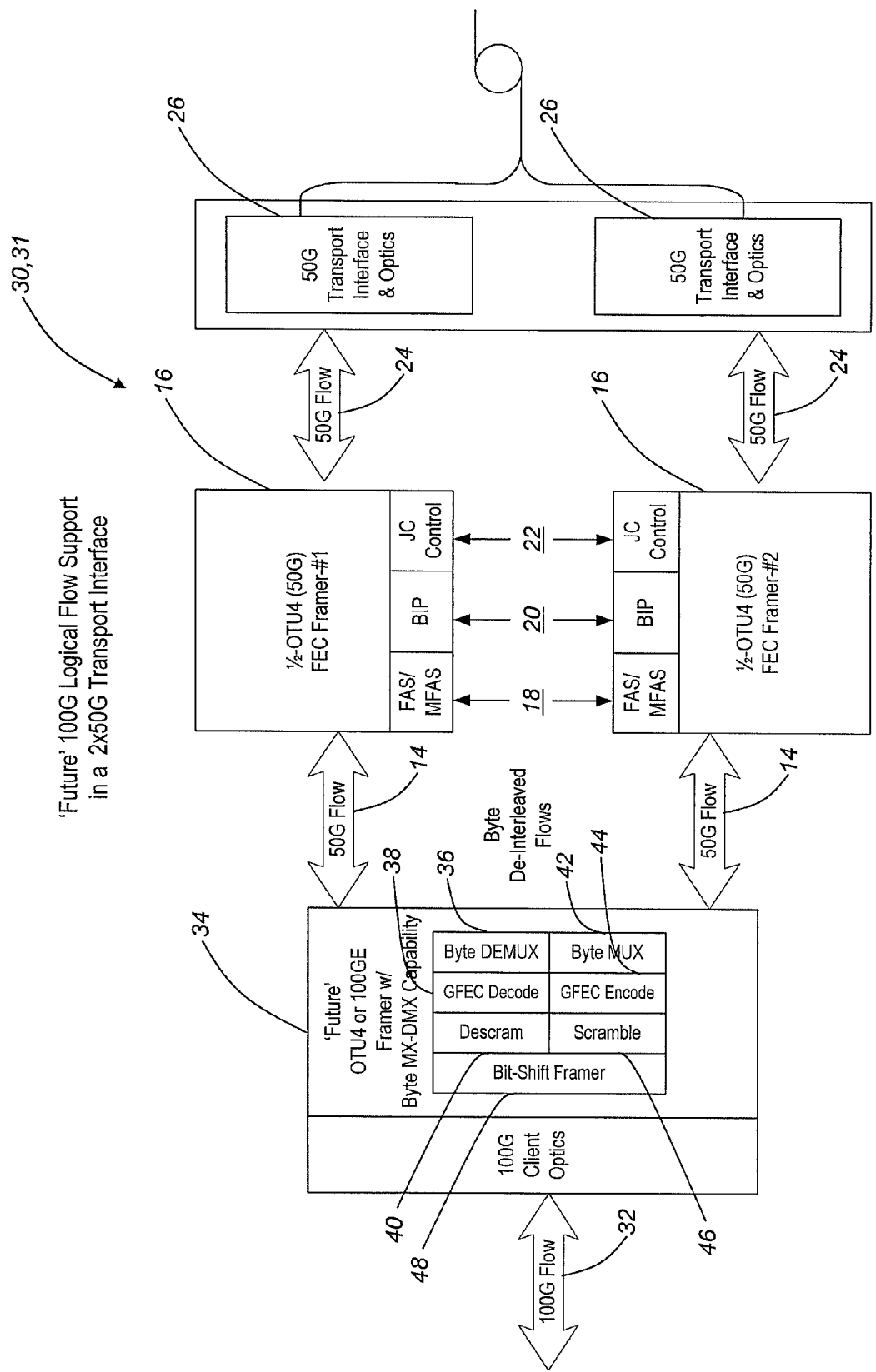
FIG. 2 is a schematic diagram illustrating, in one exemplary embodiment of the present invention, a 100 Gb/s (100 G) MUXPONDER utilizing 2×50 G transport.

FIG. 2 is a schematic diagram 30 illustrating, in one exemplary embodiment of the present invention, a 100 G MUX-PONDER 31 utilizing 2×50 G transport. A 100 G logical flow 32 received at an OTU4 or 100 GbE framer 34 with byte-multiplex (MUX)/demultiplex (DEMUX) capability or the like is received as two 50 G logical flows 14 at two ½-OTU4 (50 G) FEC framers 16 which are synchronized, as appropriate, via FAS and MFAS 18, BIP 20, and JC 22. These two 50 G framed logical flows 24 are then received at two 50 G transport interface and optics modules 26 for transport utilizing a DPSK, DQPSK, RZ-DQPSK modulation scheme, or the like. Of note, four 25 G logical flows (not illustrated) could also be utilized, four ¼-OTU4 (25 G) FEC framers (not illustrated) could also be used, etc. Also of note, although one logical flow direction has been described herein, the opposite logical flow direction would operate similarly. Preferably, the OTU4 or 100 GbE framer 34 with byte-MUX/DEMUX capability or the like is operable for byte-demultiplexing (DE-MUXing) 36, GFEC decoding 38, and descrambling 20 a client signal, as well as byte-multiplexing (MUXing) 42, GFEC encoding 44, and scrambling 46 received channels in association with a bit-shift framer 48, as described in greater detail in FIGS. 5 and 6.

Figure 3:
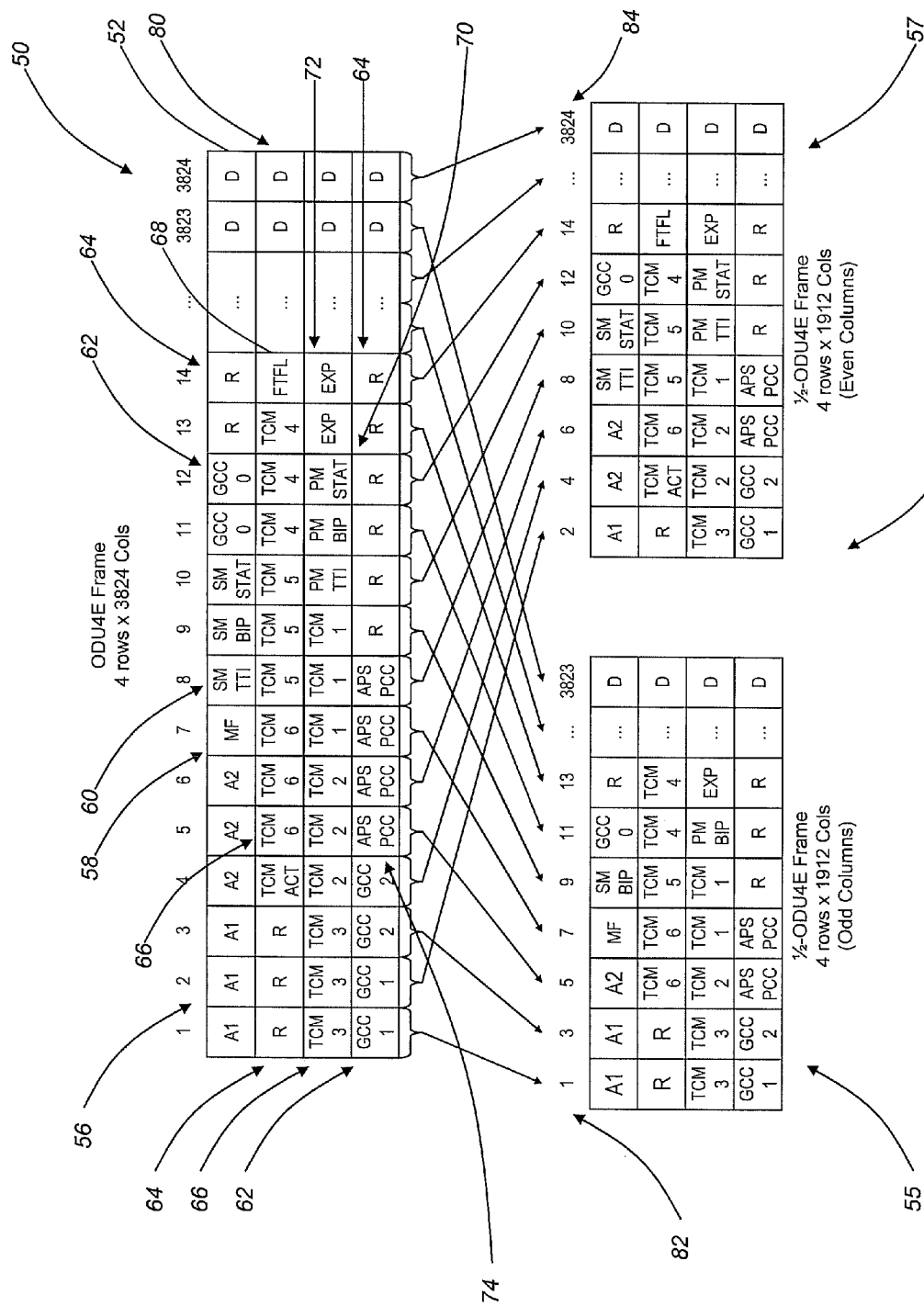
FIG. 3 is a schematic diagram illustrating, in one exemplary embodiment of the present invention, 100 G transport via the byte-interleaving of two 50 G signals, and, specifically, the byte-demultiplexing (DEMUXing) of an Optical Data Unit 4E (ODU4E) frame into two 50 G tributaries and the creation of two ½-ODU4E frames.

FIG. 3 is a schematic diagram 50 illustrating, in one exemplary embodiment of the present invention, 100 G transport via the byte-interleaving of two 50 G signals, and, specifically, the byte-DEMUXing of an Optical Data Unit 4E (ODU4E) frame 52 into two 50 G tributaries and the creation of two ½-ODU4E frames 54. The ODU4E frame 52 includes 4 rows×3824 columns and essentially represents an OTU4 frame without FEC. The ODU4E frame 52 includes all of the standard bytes associated with International Telecommunications Union (ITU-T) G.709, including six framing bytes (A1 and A2) 56, a multi-frame alignment signal byte (MF) 58, three section monitoring bytes (SM TTI, SM BIP, and SM STAT) 60, six general communication channel bytes (GCC 0, GCC 1, and GCC2) 62, eleven reserved bytes (R) 64, nineteen tandem connection monitoring bytes (TCM ACT, TCM 6, TCM 5, TCM 4, TCM 3, TCM 2, and TCM 1) 66, a fault type and fault location byte (FTFL) 68, three path monitoring bytes (PM TTI, PM BIP, and PM STAT) 70, two experimental bytes (EXP) 72, and four automatic protection switching/ protection communication channel bytes (APS PCC) 74, in addition to the data bytes (D) 80. Each of the ½-ODU4E frames 54 includes 4 rows×1912 columns and is associated with a separate field-programmable gate array (FPGA) or the like. The Odd Column ½-ODU4E frame 55 includes three framing bytes (A1 and A2) 56, a multi-frame alignment signal byte (MF) 58, a section monitoring byte (SM BIP) 60, three general communication channel bytes (GCC 0, GCC 1, and GCC2) 62, six reserved bytes (R) 64, ten tandem connection monitoring bytes (TCM 6, TCM 5, TCM 4, TCM 3, TCM 2, and TCM 1) 66, a path monitoring byte (PM BIP) 70, an experimental byte (EXP) 72, and two automatic protection switching/protection communication channel bytes (APS PCC) 74, in addition to the data bytes (D) 80. The Even Column ½-ODU4E frame 57 includes three framing bytes (A1 and A2) 56, two section monitoring bytes (SM TTI and SM STAT) 60, three general communication channel bytes (GCC 0, GCC 1, and GCC2) 62, five reserved bytes (R) 64, nine tandem connection monitoring bytes (TCM ACT, TCM 6, TCM 5, TCM 4, TCM 3, TCM 2, and TCM 1) 66, a fault type and fault location byte (FTFL) 68, two path monitoring bytes (PM TTI and PM STAT) 70, an experimental byte (EXP) 72, and two automatic protection switching/protection communication channel bytes (APS PCC) 74, in addition to the data bytes (D) 80. Thus, the odd columns 82 of the ODU4E frame 52 are arranged into the Odd Column ½-ODU4E frame 55 and the even columns 84 of the ODU4E frame 52 are arranged into the Even Column ½-ODU4E frame 57, as illustrated and described.

Figure 4A:
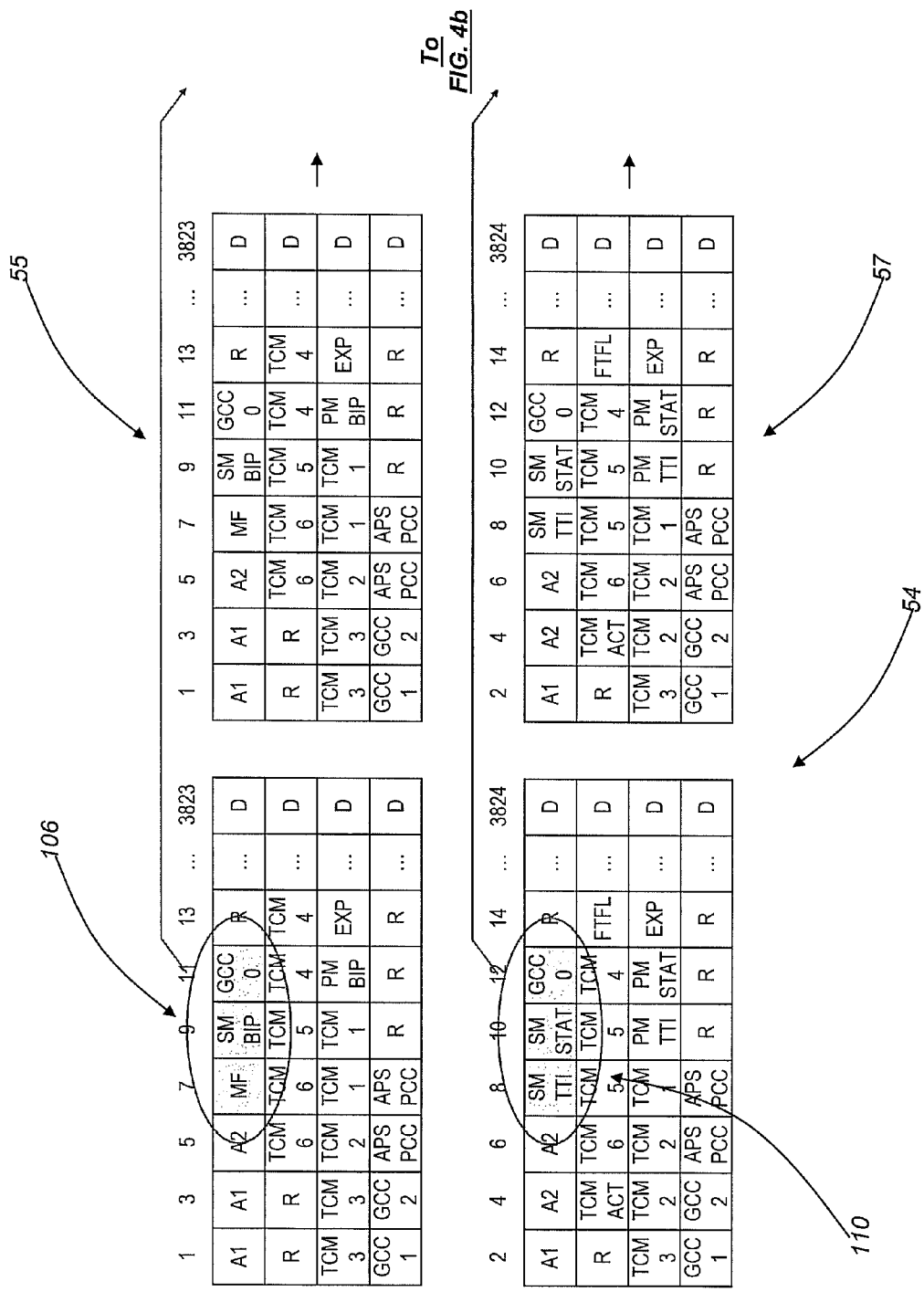
FIGS. 4A and 4B are schematics diagram illustrating, in one exemplary embodiment of the present invention, 100 G transport via the byte-interleaving of two 50 G signals, and, specifically, the byte-DEMUXing of an ODU4E frame into two 50 G tributaries, the combining of a pair of Odd Column ½-ODU4E frames into a single "odd" frame for transport, and the combining of a pair of Even Column ½-ODU4E frames into a single "even" frame for transport.
Figure 4B:
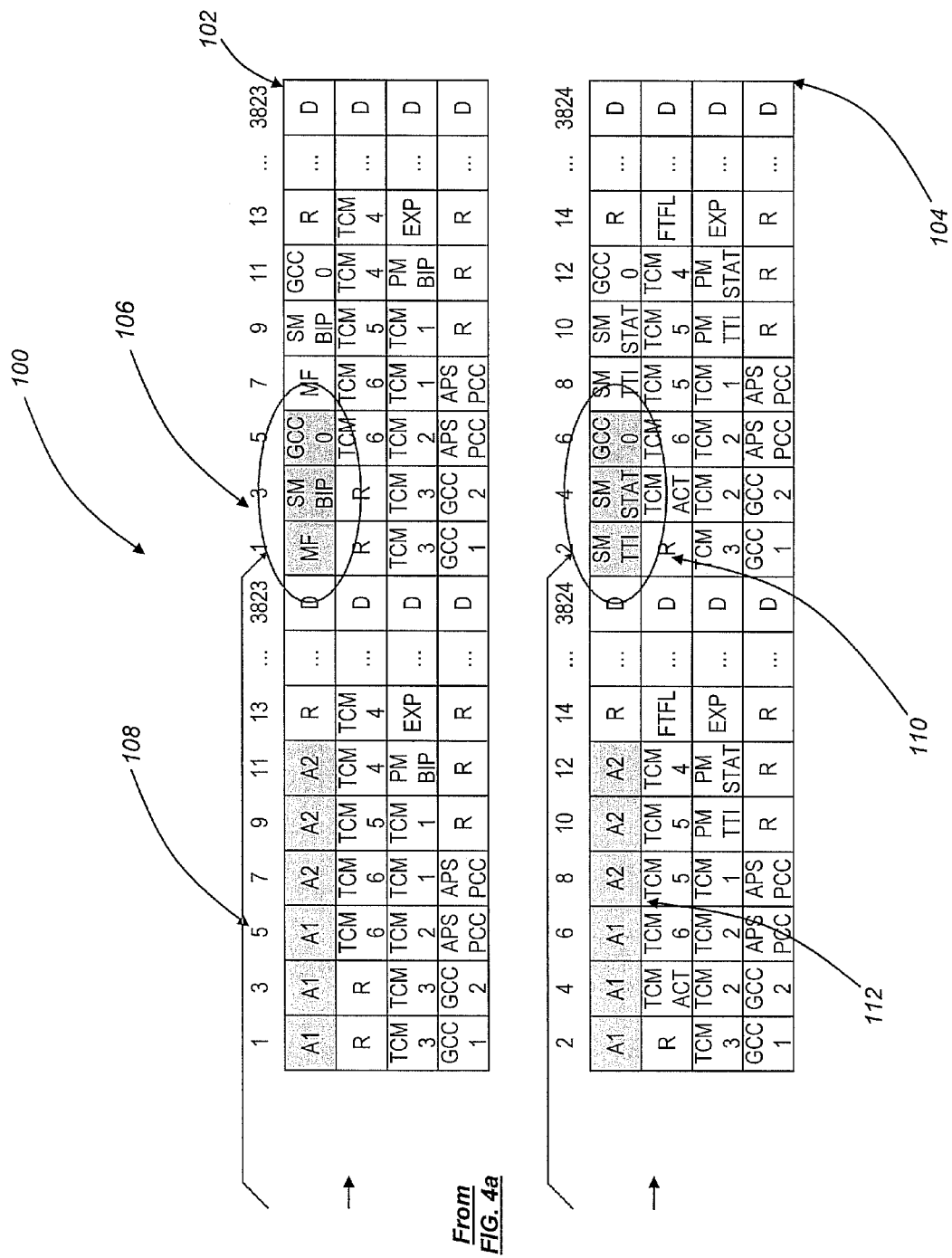

FIG. 4 is another schematic diagram 100 illustrating, in one exemplary embodiment of the present invention, 100 G transport via the byte-interleaving of two 50 G signals, and, specifically, the byte-DEMUXing of an ODU4E frame 52 into two 50 G tributaries, the combining of a pair of Odd Column ½-ODU4E frames 55 into a single "odd" frame 102 for transport, and the combining of a pair of Even Column ½-ODU4E frames 57 into a single "even" frame 104 for transport. Again, each of the ½-ODU4E frames 54 includes 4 rows×1912 columns. The odd transport frame 102 includes 4 rows×3824 columns. Likewise, the even transport frame 104 includes 4 rows×3824 columns. For the odd transport frame 102, the MFAS, SM-BIP, and first GCC 0 bytes (collectively 106) are relocated to row 1, columns 1, 3, and 5, respectively, of the second half of the odd transport frame 102. FAS bytes (A1A1A1A2A2A2) (collectively 108) are inserted at row 1, columns 1, 3, 5, 7, 9, and 11, respectively, of the first half of the odd transport frame 102. 256 columns of FEC are calculated over the 3824 columns of the odd transport frame 102 and inserted at the end of the eth frame creating the odd transport signal. For the even transport frame 104, the SM-TTI, SM-STAT, and second GCC 0 bytes (collectively 110) are relocated to row 1, columns 2, 4, and 6, respectively, of the second half of the even transport frame 104. FAS bytes (A1A1A1A2A2A2) (collectively 112) are inserted at row 1, columns 2, 4, 6, 8, 10, and 12, respectively, of the first half of the even transport frame 104. 256 columns of FEC are calculated over the 3824 columns of the even transport frame 104 and inserted at the end of the eth frame creating the even transport signal.

Figure 5:
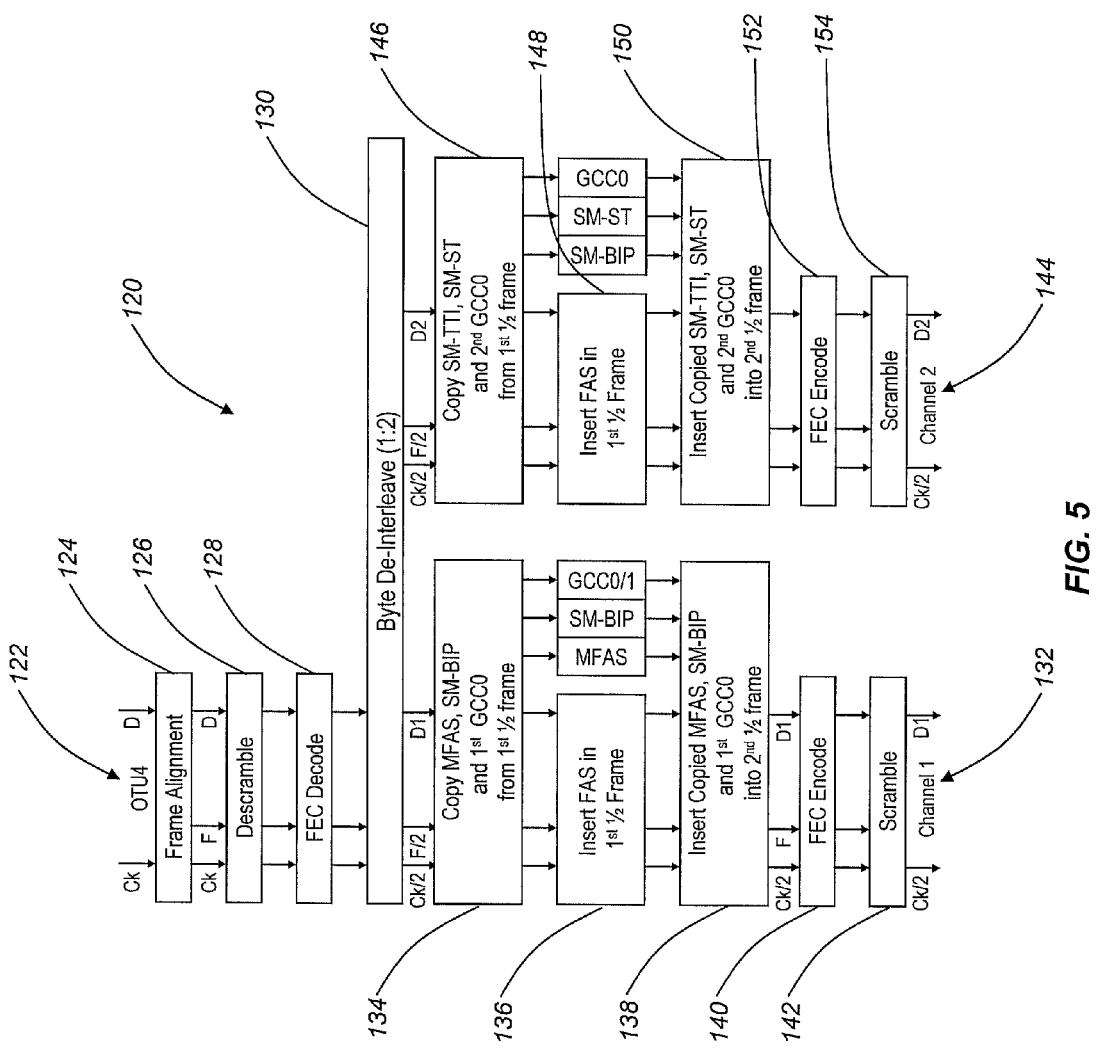
FIG. 5 is a flow diagram illustrating, in one exemplary embodiment of the present invention, 100 G transport via the byte-interleaving of two 50 G signals, and, specifically, the byte-DEMUXing of an ODU4E frame into two 50 G tributaries and the creation of two ½-ODU4E frames.

FIG. 5 is a flow diagram 120 illustrating, in one exemplary embodiment of the present invention, 100 G transport via the byte-interleaving of two 50 G signals, and, specifically, the byte-DEMUXing of an ODU4E frame into two 50 G tributaries and the creation of two ½-ODU4E frames, for example. The process beings by receiving the OTU4 client signal 122 and performing frame alignment 124, descrambling 126, and FEC decoding 128. Byte-deinterleaving (1:2) 130 into two ½ frames is then performed. Related to channel 1 132, The MFAS, SM-BIP, and $1^{st}$ GCC0 bytes are copied from the first ½ frame 134, the FAS bytes are inserted into the first ½ frame 136, and the copied MFAS, SM-BIP, and $1^{st}$ GCC0 bytes are inserted into the second ½ frame 138, as described in detail in FIGS. 3 and 4. Finally, FEC encoding 140 and scrambling 142 are performed. Related to channel 2 144, The SM-TTI, SM-ST, and $2^{nd}$ GCC0 bytes are copied from the first ½ frame 146, the FAS bytes are inserted into the first ½ frame 148, and the copied SM-TTI, SM-ST, and $2^{nd}$ GCC0 bytes are inserted into the second ½ frame 150, as also described in detail in FIGS. 3 and 4. Finally, FEC encoding 152 and scrambling 154 are performed—resulting in channel 1 132 and channel 2 144 for transport.

Figure 6:
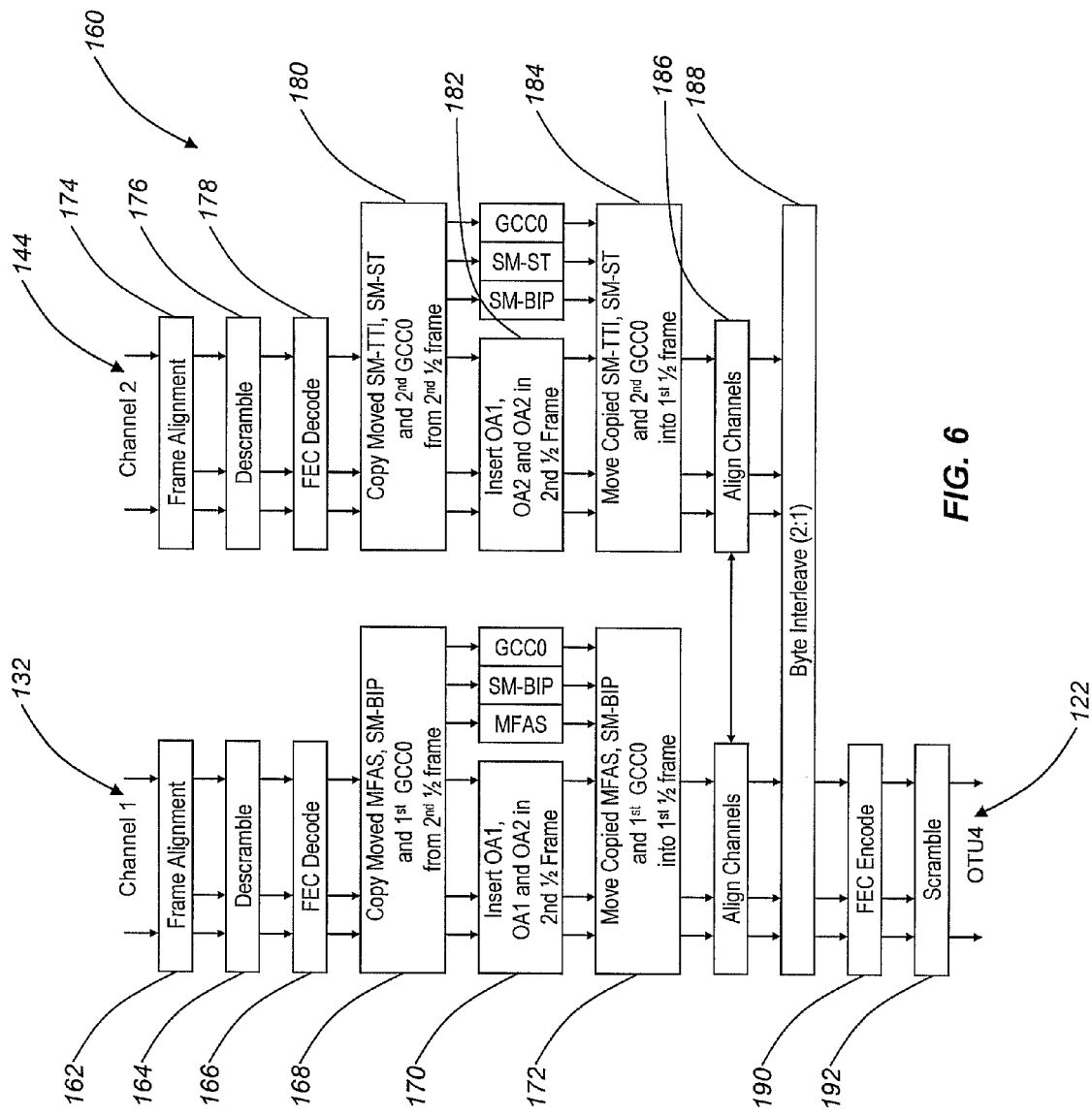
FIG. 6 is another flow diagram illustrating, in one exemplary embodiment of the present invention, 100 G transport via the byte-interleaving of two 50 G signals, and, specifically, the byte-MUXing of two 50 G tributaries, i.e. two ½-ODU4E frames, into an ODU4E frame.

FIG. 6 is another flow diagram 160 illustrating, in one exemplary embodiment of the present invention, 100 G transport via the byte-interleaving of two 50 G signals, and, specifically, the byte-MUXing of two 50 G tributaries, i.e. two ½-ODU4E frames, into an ODU4E frame, for example. The process beings by receiving channel 1 132 and channel 2 144. Related to channel 1 132, frame alignment 162, descrambling 164, and FEC decoding 166 are first performed. The moved MFAS, SM-BIP, and $1^{st}$ GCC0 bytes are then copied from the second ½ frame 168, the OA1, OA1, and OA2 bytes are inserted into the second ½ frame 170, and the copied MFAS, SM-BIP, and $1^{st}$ GCC0 bytes are inserted into the first ½ frame 172, as described in detail in FIGS. 3 and 4. Related to channel 2 144, frame alignment 174, descrambling 176, and FEC decoding 178 are first performed. The moved SM-TTI, SM-ST, and $2^{nd}$ GCC0 bytes are then copied from the second ½ frame 180, the OA1, OA2, and OA2 bytes are inserted into the second ½ frame 182, and the copied SM-TTI, SM-ST, and $2^{nd}$ GCC0 bytes are inserted into the first ½ frame 184, as also described in detail in FIGS. 3 and 4. Finally, channel alignment 186, byte-interleaving (2:1) 188, FEC encoding 190, and scrambling 192 are performed—resulting in the OTU4 client signal 122.

It should be noted that the above is exemplary and that these concepts can be extended to much higher-data rate signals now and in the future. For example, the concepts can be applied to 2×, 4×, 8×, etc. underlying systems (e.g. 160 G carried via 4×40 G or 8×20 G).

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A multiplexing transponder, comprising:
   a plurality of framers operable for receiving one or more incoming logical flows, byte-deinterleaving the one or more incoming logical flows, and creating a plurality of outgoing logical flows; and
   a plurality of transport interface and optics modules operable for receiving the plurality of outgoing logical flows and transporting the plurality of outgoing logical flows on one or more channels along an optical network;
   wherein the plurality of framers are operable for creating a plurality of first frames and a plurality of second frames; combining a pair of first frames to create a first transport frame and combining a pair of second frames to create a second transport frame, wherein each of the first transport frame and the second transport frame comprise overhead computed with respect to each other and each of the first transport frame and the second transport frame are individually forward error correction encoded.

2. The multiplexing transponder of claim 1, wherein the one or more incoming logical flows comprise one or more incoming logical flows selected from the group consisting of a 100 G incoming logical flow, 2×50 G incoming logical flows, 4×25 G incoming logical flows, 10×10 G incoming logical flows, and 2×(40 G+10 G) incoming logical flows.

3. The multiplexing transponder of claim 1, wherein the plurality of outgoing logical flows comprise a plurality of outgoing logical flows selected from the group consisting of 2×50 G outgoing logical flows and 4×25 G outgoing logical flows.

4. The multiplexing transponder of claim 1, wherein the plurality of transport interface and optics modules comprise a plurality of transport interface and optics modules selected form the group consisting of two 50 G transport interface and optics modules and four 25 G transport interface and optics modules.

5. The multiplexing transponder of claim 1, wherein the one or more channels comprise one or more channels selected from the group consisting of two channels and four channels.

6. The multiplexing transponder of claim 1, wherein the one or more incoming logical flows comprise 2×50 G logical flows.

7. The multiplexing transponder of claim 6, wherein the 2×50 G logical flows emanate from a 100 G framer with byte-multiplex/demultiplex capability.

8. The multiplexing transponder of claim 6, wherein the plurality of framers comprise two 50 G FEC framers.

9. The multiplexing transponder of claim 8, wherein the two 50 G FEC framers are operable for creating a plurality of odd column 50 G frames and a plurality of even column 50 G frames; combining a pair of odd column 50 G frames to create an odd transport frame and combining a pair of even column 50 G frames to create an even transport frame; relocating selected bytes from a first odd column 50 G frame to a second half of the odd transport frame and relocating selected bytes from a first even column 50 G frame to a second half of the even transport frame; inserting selected bytes into the first half of the odd transport frame and inserting selected bytes into the first half of the even transport frame; and inserting FEC columns into the odd transport frame and inserting FEC columns into the even transport frame.

10. The multiplexing transponder of claim 1, further comprising means for frame aligning, descrambling, and FEC decoding the one or more incoming logical flows.

11. The multiplexing transponder of claim 1, further comprising means for FEC encoding and scrambling the plurality of outgoing logical flows.

12. A method for high-data rate optical transport enabling multi-level optical transmission, comprising:
receiving a high-data rate client signal;
1:2 byte-deinterleaving the high-data rate client signal into a plurality of odd column frames and a plurality of even column frames;
combining a pair of odd column frames to create an odd transport frame and combining a pair of even column frames to create an even transport frame;
relocating selected bytes from a first half of the odd transport frame to a second half of the odd transport frame and relocating selected bytes from a first half of the even transport frame to a second half of the even transport frame;
inserting selected bytes into the first half of the odd transport frame and inserting selected bytes into the first half of the even transport frame;
inserting FEC columns into the odd transport frame and inserting FEC columns into the even transport frame; and
providing a first logical flow associated with the odd transport frame and a first channel and providing a second logical flow associated with the even transport frame and a second channel.

13. The method of claim 12, wherein the high-data rate client signal comprises a 100 G client signal, the plurality of odd column frames comprise a plurality of odd column 50 G frames, and the plurality of even column frames comprise a plurality of even column 50 G frames.

14. The method of claim 12, further comprising frame aligning, descrambling, and FEC decoding the high-date rate client signal.

15. The method of claim 13, wherein the selected bytes relocated from the first half of the odd transport frame to the second half of the odd transport frame comprise MFAS, SM-BIP, and GCC0 bytes.

16. The method of claim 13, wherein the selected bytes relocated from the first half of the even transport frame to the second half of the even transport frame comprise SM-TTI, SM-ST, and GCC0 bytes.

17. The method of claim 13, wherein the selected bytes inserted into the first half of the odd transport frame comprise FAS bytes and the selected bytes inserted into the first half of the even transport frame comprise FAS bytes.

18. The method of claim 12, further comprising scrambling each of the first logical flow and the second logical flow.

19. The method of claim 12, further comprising transporting the first channel and the second channel over a single wavelength in an optical network.

20. A method for high-data rate optical transport enabling multi-level optical transmission, comprising:
receiving a first logical flow associated with an odd transport frame and a first channel and receiving a second logical flow associated with an even transport frame and a second channel;
relocating selected bytes from a second half of the odd transport frame to a first half of the odd transport frame and relocating selected bytes from a second half of the even transport frame to a first half of the even transport frame;
inserting selected bytes into the second half of the odd transport frame and inserting selected bytes into the second half of the even transport frame;
separating the odd transport frame into a pair of odd column frames and separating the even transport frame into a pair of even column frames;
aligning the first channel and the second channel; and
2:1 byte-interleaving the pair of odd column frames and the pair of even column frames into a high-data rate client signal.

21. The method of claim 20, wherein the pair of odd column frames comprise a pair of odd column 50 G frames, the pair of even column frames comprise a pair of even column 50 G frames, and the high-data rate client signal comprises a 100 G client signal.

22. The method of claim 20, further comprising frame aligning, descrambling, and FEC decoding the first channel and the second channel.

23. The method of claim 21, wherein the selected bytes relocated from the second half of the odd transport frame to the first half of the odd transport frame comprise MFAS, SM-BIP, and GCC0 bytes.

24. The method of claim 21, wherein the selected bytes relocated from the second half of the even transport frame to the first half of the even transport frame comprise SM-TTI, SM-ST, and GCC0 bytes.

25. The method of claim 21, wherein the selected bytes inserted into the second half of the odd transport frame comprise OA bytes and the selected bytes inserted into the second half of the even transport frame comprise OA bytes.

* * * * *